(12) United States Patent
Aimi et al.

(10) Patent No.: US 8,199,111 B2
(45) Date of Patent: Jun. 12, 2012

(54) REMOTE INPUT DEVICE AND ELECTRONIC APPARATUS USING THE SAME

(75) Inventors: Satoru Aimi, Tokyo (JP); Yoshinobu Hosaka, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1161 days.

(21) Appl. No.: 11/828,745

(22) Filed: Jul. 26, 2007

(65) Prior Publication Data

US 2008/0024451 A1    Jan. 31, 2008

(30) Foreign Application Priority Data

Jul. 27, 2006   (JP) .................... 2006-204392

(51) Int. Cl.
*G06F 3/048* (2006.01)
*G06F 3/02* (2006.01)
(52) U.S. Cl. .................... 345/168; 715/702; 715/810
(58) Field of Classification Search .................. 345/156, 345/173, 158; 178/18.01–18.09; 715/702, 715/810; 348/738
See application file for complete search history.

(56) References Cited

U.S. PATENT DOCUMENTS

| | | | |
|---|---|---|---|
| 5,186,629 A * | 2/1993 | Rohen | 434/114 |
| 6,052,070 A * | 4/2000 | Kivela et al. | 341/22 |
| 7,269,843 B2 * | 9/2007 | Yamaguchi et al. | 725/141 |
| 7,607,150 B1 | 10/2009 | Kobayashi et al. | |
| 2004/0030807 A1 | 2/2004 | Wessler et al. | |
| 2004/0041723 A1 | 3/2004 | Shibamiya et al. | |
| 2004/0122572 A1 | 6/2004 | Ichinose | |
| 2004/0135823 A1 | 7/2004 | Wingett et al. | |
| 2005/0261786 A1 * | 11/2005 | Eager et al. | 700/17 |
| 2007/0137901 A1 * | 6/2007 | Chen | 178/18.01 |

FOREIGN PATENT DOCUMENTS

| | | |
|---|---|---|
| JP | 06-078381 | 3/1994 |
| JP | 6 078381 | 3/1994 |
| JP | 2000-305704 | 11/2000 |
| JP | 2001-202173 | 7/2001 |
| JP | 2002-278688 | 9/2002 |
| JP | 2003-348371 | 12/2003 |
| WO | WO 00/33572 | 6/2000 |

OTHER PUBLICATIONS

European Search Report for corresponding EP Application No. 07106868.8, dated Nov. 18, 2011, 7 pages.

* cited by examiner

*Primary Examiner* — Alexander S Beck
*Assistant Examiner* — Jeffrey Steinberg
(74) *Attorney, Agent, or Firm* — Brinks Hofer Gilson & Lione

(57) ABSTRACT

An electronic apparatus includes a remote input device, which has input-operation areas and a means for detecting input operations performed on the input-operation areas; a displaying portion for displaying selection buttons on a display; and an allocating portion for allocating the selection buttons to the input-operation areas. When the number of selection buttons is larger than that of input-operation areas, the allocating portion allocates change selection buttons indicating an allocation change to some of the input-operation areas. The apparatus further includes an input determining portion for determining, when the detecting portion detects an input operation performed on any of the input-operation areas, if the input operation is performed on the selection button allocated to the input-operation area. An allocation changing portion changes the allocation of the selection buttons relative to selected input-operation areas when the input determining portion determines that the input operation is performed on the change selection button.

17 Claims, 11 Drawing Sheets

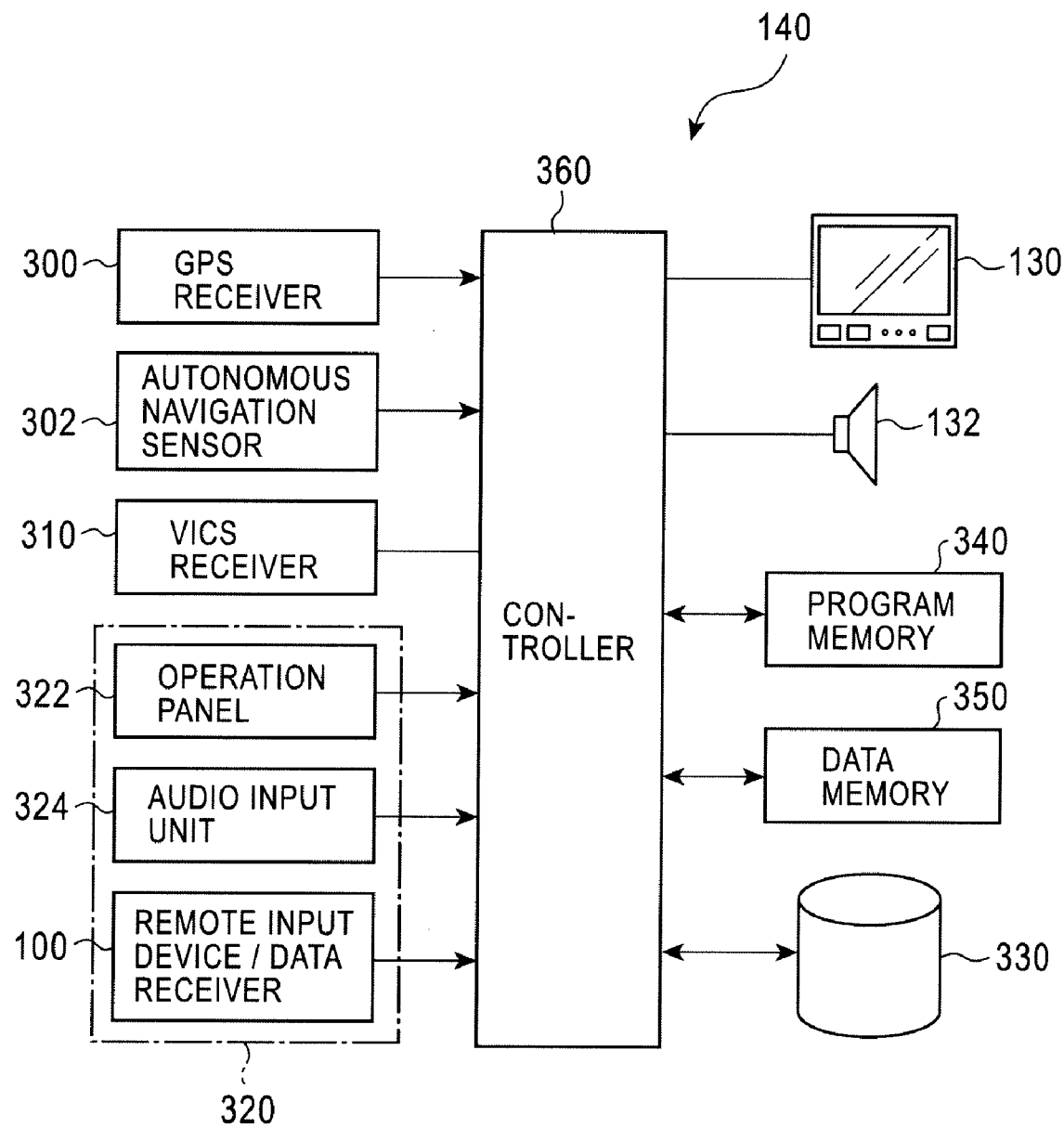

FIG. 7
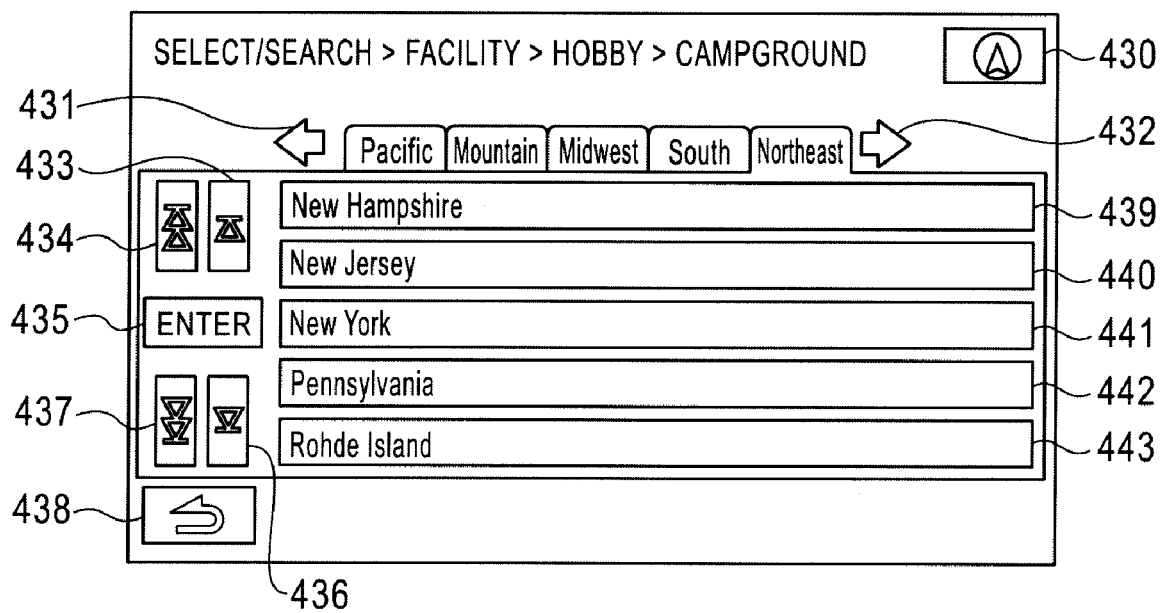
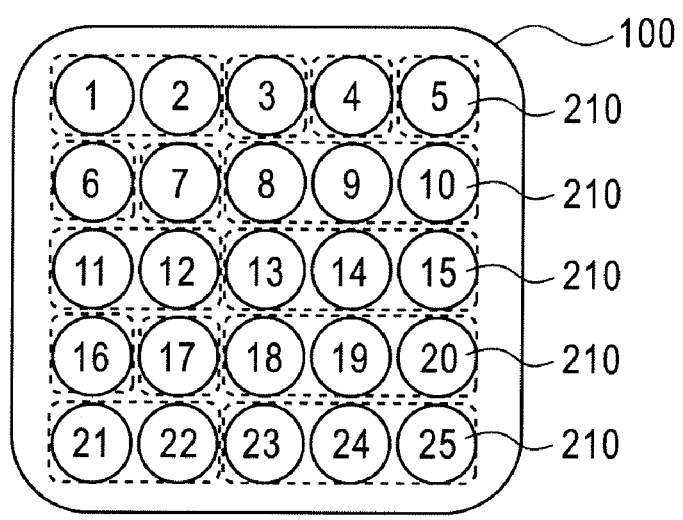

FIG. 8
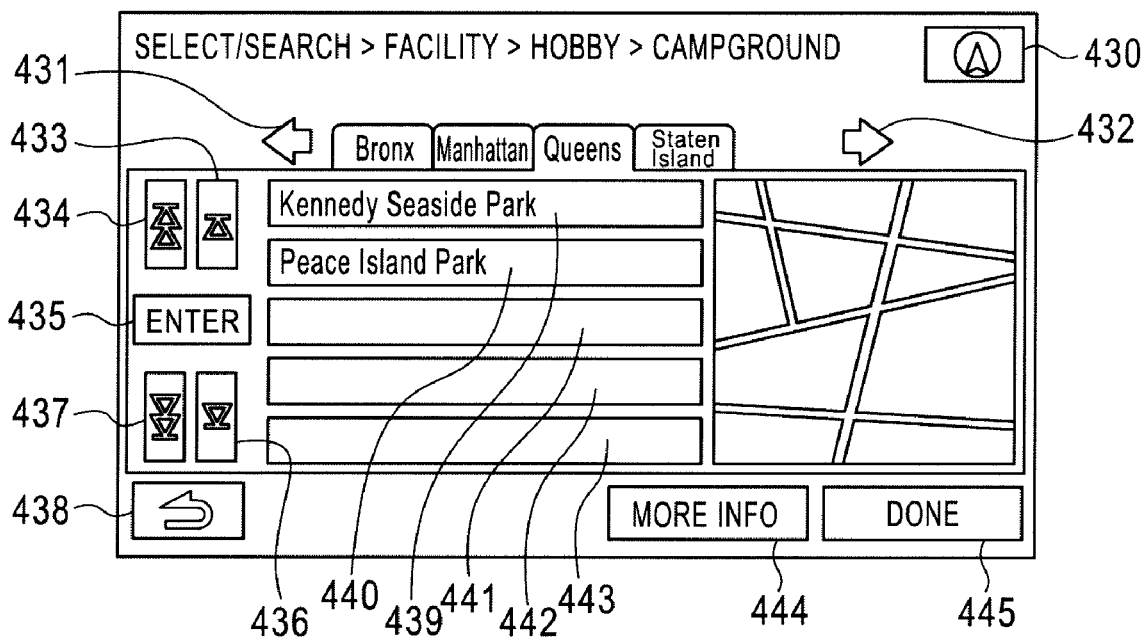
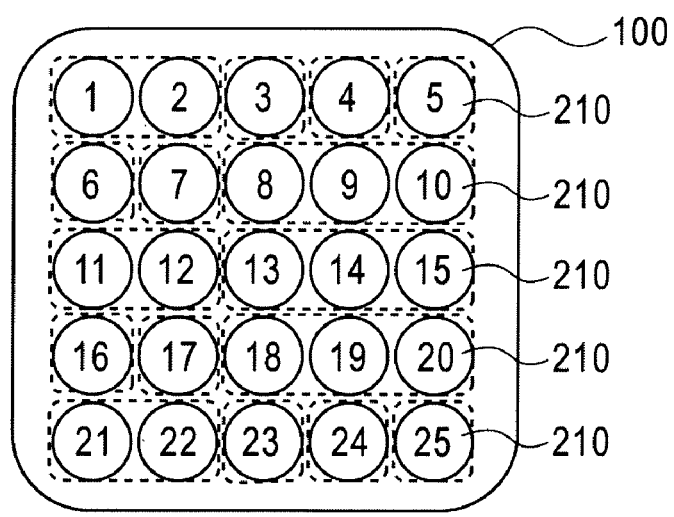

REMOTE INPUT DEVICE AND ELECTRONIC APPARATUS USING THE SAME

RELATED APPLICATIONS

The present application claims priority to Japanese Patent Application Serial Number 2006-204392, filed on Jul. 27, 2006, the entirety of which is hereby incorporated by reference.

BACKGROUND OF THE INVENTION

1. Field of the Invention

The present invention relates to remote input devices and electronic apparatuses using the same. In particular, the present invention relates to a technology for performing a remote input operation while a user is viewing representations displayed on a display.

2. Description of the Related Art

Audio/video devices, television receivers, navigation devices, and other electronic devices have input devices for accepting user's instructions. Typical examples of available input devices include keyboards, remote controllers, and touch panels. With such an input device, input operations are performed through, for example, operating keys, moving a cursor with a mouse, or touching a display.

Japanese Unexamined Patent Application Publication No. 6-78381 (Patent Document 1) discloses a technology in which the operation of a remote control device is checked on the screen of a display. The remote control device is equipped with a plate-shaped touch panel. When it is detected that a finger touches the touch panel, a menu screen is displayed on the display. The menu screen has multiple input areas, each corresponding to multiple contact areas on the touch panel. When the user touches a predetermined contact area on the touch panel, a corresponding input area on the menu screen is displayed in a different color from the color of the other areas, so that the user can easily recognize which input area is currently selected. Patent Document 1 also discloses a double-layer plate-shaped touch panel having a structure in which sheets 602 and 604 are stacked on a sheet 600, as shown in FIG. 12. When a contact portion 606 is lightly pressed with a finger F, an electrical connection for the contact portion 606 is established and a conductor strip 608 below are electrically connected, and when the contact portion 606 is depressed with a greater strength, an electrical connection between the conductor strips 610 and 612 are established.

Japanese Unexamined Patent Application Publication No. 2003-348371 (Patent Document 2) discloses a remote control device provided with a track pad that allows position information and contact information to be detected by moving a finger while touching the track pad. In this remote control device, the track pad and an input area (an operation panel) that is displayed on a display are associated with each other so as to allow a corresponding input screen area to be selected in accordance with the position information obtained from the track pad. Patent Document 2 further discloses a fixed-position mode and a scroll mode. In the fixed-position mode, the input screen areas are allocated to the area positions on the track pad on a one-to-one basis. For a general keyboard or the like having a large number of input areas, the scroll mode is used to allocate some of the input areas to the area positions on the track pad.

Accepting input operations with an electronic apparatus is performed in various forms depending on the type of apparatus or the operation state. Thus, particularly, when a virtual keyboard having multiple keys is displayed on the display, the input schemes using the known remote input devices have a problem in that it is difficult to provide each remote input device with multiple input-operation areas that correspond to all of the keys on a one-to-one basis. In this case, an arrangement as disclosed in, for example, Patent Document 2 described above may be employed. In Patent Document 2, some of the multiple keys are allocated to the input-operation areas of the input device, and the remaining keys that are not allocated thereto can be selected through shifting the finger's contact position on the track pad to scroll the keys allocated to the input-operation areas. In this scroll operation, based on the finger's contact position, the keys corresponding to the vicinity of the contact position are reallocated to the input-operation areas of the track pad. With this arrangement, however, it is difficult for the user to easily recognize how much the finger's contact position on the track pad should be moved to obtain an appropriate scroll position or which reallocated keys correspond to which of the input-operation areas of the track pad.

SUMMARY OF THE INVENTION

To overcome the problems described above, an object of the present invention is to provide an electronic apparatus, an electronic-apparatus input method, and an input program which allow a user to easily perform remote entering of instructions via input operations while viewing a display.

One aspect of the present invention provides an electronic apparatus. The apparatus includes a remote input device including multiple input-operation areas and a detecting portion for detecting an input operation performed on the multiple input-operation areas; a display; a displaying portion for displaying multiple selection buttons for prompting input via the display; and an allocating portion for allocating the multiple selection buttons among the multiple input-operation areas. When the number of selection buttons is larger than the number of input-operation areas, the allocating portion allocates at least one change selection button to at least one of the input-operation areas, the change selection button indicating an allocation change, operable to permit an allocation change, or otherwise associated with an allocation change. The apparatus further includes an input determining portion for determining, when the detecting portion detects an input operation performed on any of the multiple input-operation areas, that the input operation is performed on the selection button allocated to the detected input-operation area. The allocating portion includes allocation changing means for changing the allocation of the selection buttons relative to selected multiple input-operation areas, when the input determining portion determines that the input operation is performed via the change selection button.

The selection buttons displayed on the display may be any representations that prompt input from the user or any representations that guide input operations, and the names, shapes, sizes, positions, and so on of the selection buttons are not limited to those used herein and should be broadly construed. For example, the selection buttons include input representations, selection representations, input buttons, menus, control representations, various keys on the virtual keyboard, other types of keys, various icons and marks, various fields, and other representations, and thus are not limiting.

Preferably, the multiple input-operation areas are arranged in a two-dimensional array having multiple columns and multiple rows, and the allocating portion allocates the at least one change selection button to at least one input-operation area corresponding to a first column and a last column or a first row and a last row of the two-dimensional array. In this case, preferably, the selected input-operation areas are the input-operation areas between the first column and the last column or between the first row and the last row.

Preferably, the displaying portion displays the selection buttons corresponding to the selected input-operation areas with a greater magnification. Preferably, the displaying portion displays the change selection button so as to be distinguished from the other selection buttons. Preferably, the change selection button is a scroll key or a move key operable to scroll, slide, or otherwise move the images displayed.

Preferably, the detecting portion detects a first input operation resulting from a first pressure sensed on any of the multiple input-operation areas and a second input operation resulting from a second pressure sensed greater than the first pressure, and the displaying portion displays the multiple selection buttons on the display when the detecting portion detects the first input operation. The displaying portion may display the multiple selection buttons on the display for a certain period of time after the detecting portion detects the first or the second input operation.

When displaying a virtual keyboard has multiple selection buttons, the displaying portion can display the change selection buttons, allocated in the first column and the last column or the first row and the last row of the two-dimensional array, between selected columns or selected rows of the virtual keyboard in an interposed manner. Alternatively, when displaying a virtual keyboard with multiple selection buttons, the displaying portion may display the change selection buttons superimposed on selected columns or selected rows of the virtual keyboard. When input to one of the change selection buttons is performed, the displaying portion can scroll or move the change selection buttons on the virtual keyboard.

Preferably, function keys other than the scroll key or move key are allocated to the other input-operation areas in the first column and the last column or the first row and the last row of the two-dimensional array. When the detecting portion detects the first input, the displaying means can display the selection button corresponding to the detected input-operation area so as to be distinguished from the other selection buttons.

Another aspect of the present invention provides an input program for performing input operations that control operation an electronic apparatus by using a remote input device having multiple input-operations areas and a detecting portion for detecting an input to the multiple input-operation areas. The input program includes allocating means for allocating, when multiple selection buttons for prompting input operations are displayed on a display, the multiple selection buttons to the multiple input-operation areas and for allocating, when the number of selection buttons is larger than the number of input-operation areas, at least one change selection button indicating an allocation change to at least one of the multiple input-operation areas; input determining means for determining, when the detecting means detects an input operation performed via any of the multiple input-operation areas, that input operation is performed on the selection button allocated to the detected input-operation area; and allocation changing means for changing the allocation of the selection buttons relative to selected multiple input-operation areas, when the input determining means determines that the input operation is performed on the change selection button.

Still another aspect of the present invention provides an input method for performing input operations that control an electronic apparatus by using a remote input device having multiple input-operations areas and a detecting portion for detecting an input to the input-operation areas. The input method includes displaying multiple selection buttons for prompting input operations via a display; allocating the multiple selection buttons to the multiple input-operation areas and of allocating, when the number of selection buttons is larger than the number of input-operation areas, at least one change selection button to at least one of the multiple input-operation areas, the change selection button indicating an allocation change; and determining, when the detecting means detects an input operation performed on any of the multiple input-operation areas, that input operation is performed on the selection button allocated to the detected input-operation area. The method further includes changing the allocation of the selection buttons relative to selected ones of the multiple input-operation areas, when it is determined that the input operation is performed on the change selection button.

According to the present invention, even when the number of selection buttons displayed on the display is larger than the number of input-operation areas, the user may easily recognize an area on which an input operation is performed and can accurately execute the input operation while viewing representations displayed on the display.

BRIEF DESCRIPTION OF THE DRAWINGS

FIG. 5 is a diagram showing the configuration of a navigation device;

FIGS. 7 and 8 are schematic views showing an example of operation when the number of selection buttons displayed on a display is smaller than the number of input-operation areas of the remote input device;

DESCRIPTION OF THE PREFERRED EMBODIMENT

An embodiment of the present invention will now be described in detail with reference to the accompanying drawings.

Figure 1:
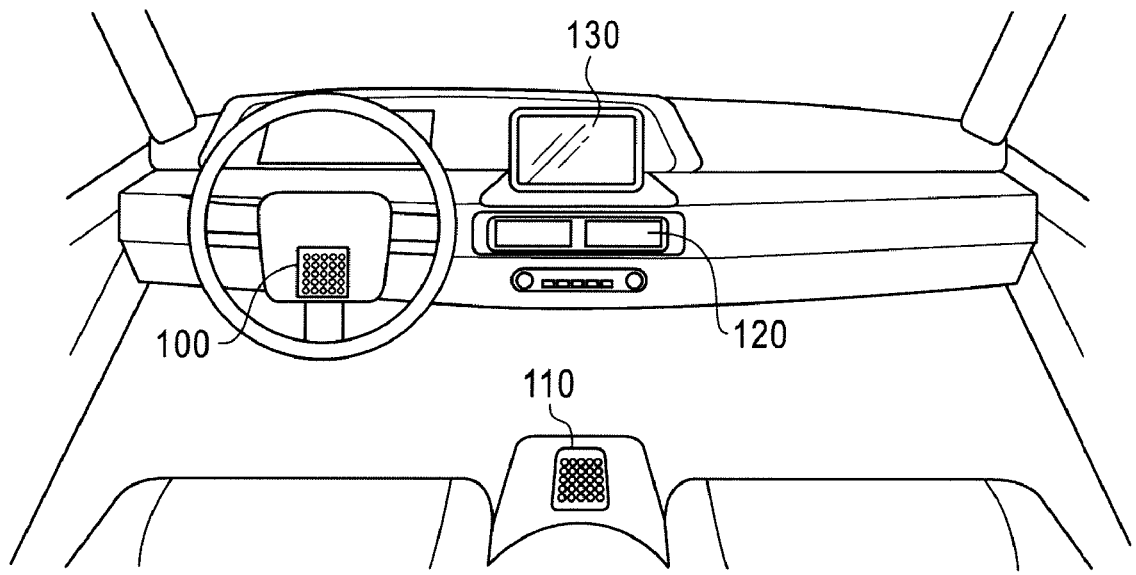
FIG. 1 is a diagram showing an example of application of a remote input device according to an embodiment of the present invention.

A remote input device according to an embodiment of the present invention is used for a vehicle-mounted electronic apparatus. As shown in FIG. 1, a first remote input device 100 is installed at a center of a steering wheel and is mainly used by the driver. A second remote input device 110 is installed between the driver's seat and the front passenger seat and is mainly used by the driver or a user in the passenger seat. The remote input devices 100 and 110 do not necessarily have to be fixed at predetermined positions and may be detachable, portable input devices.

The first and second remote input devices 100 and 110 serve as input devices for an electronic apparatus 120 including, for example, a navigation device, an audio device, and a video device, which are installed in the vehicle. It is preferable that the remote input devices 100 and 110 transmit/receive data to/from the electronic apparatus 120 through wireless communication. The data communication can be performed using, for example, a Bluetooth device, a wireless LAN (local area network), or an infrared device. Instead of the wireless communication, a cable, such as an IEEE 1394 cable, may also be used for connection with the electronic apparatus 120. Each of the remote input devices 100 and 110 has input-operation areas, which are associated with multiple selection buttons displayed on a display 130, as described below. With the input device 100 or 110, the user can perform an input operation as if he or she were virtually touching the display 130.

Figure 2:
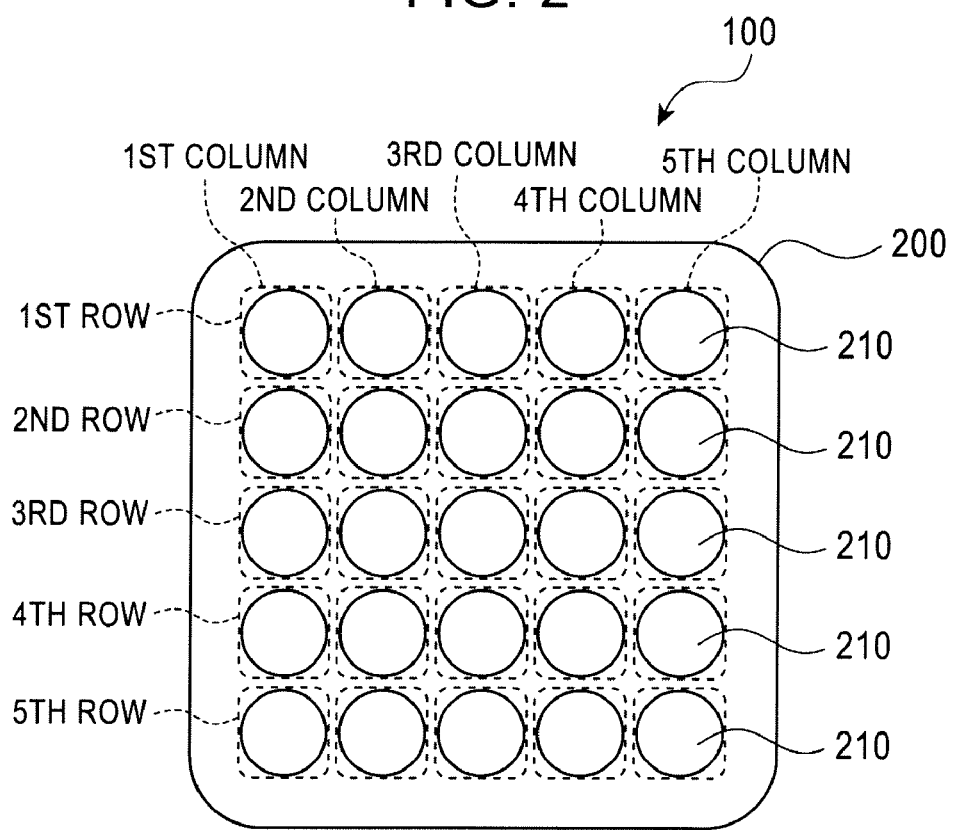
FIG. 2 is a plan view of the remote input device of the embodiment.

FIG. 2 is a plan view of the configuration of the first and second remote input devices 100 and 110. Since the remote input devices 100 and 110 have similar configurations, the description below is given with respect to the first remote input device 100 only. The remote input device 100 has a rectangular base 200, on a surface of which, multiple input-operation areas 210 are arranged in a two-dimensional array. In the present embodiment, 25 input-operation areas 210 are arranged in 5 columns×5 rows. Each input-operation area 210 is physically separated from other neighboring input-operation areas 210 and functions as an independent input switch or an independent input mechanism. It is desired that each input-operation area 210 protrude to some extent in the shape of a button so that the position thereof can be recognized by touch.

The input-operation areas 210 are configured to serve as, preferably, double-action switches, to detect a contact in two stages. For example, when a finger makes contact with or is dragged on any of the input-operation areas 210, a first-stage input thereto is detected, and when the input-operation area 210 is further pressed in this contact state, a second-stage input is detected. Alternatively, for example, when the input-operation area 210 is pressed with the finger with a first pressure, a first-stage input thereto is detected, and in this pressed state, when the input-operation area 210 is pressed with a second pressure greater than the first pressure, a second-stage input is detected.

The input detection scheme of the remote input device 100 can be realized by a known technology. For example, as disclosed in Patent Document 1 described above, the 5-column×5-row input switch mechanisms may be configured as stacked flexible sheets. Alternatively, anisotropic conductive members may be stacked to detect a depression, or flexible conductive members may be stacked to detect electrostatic capacitance that varies according to the amount of depression.

Figure 3:
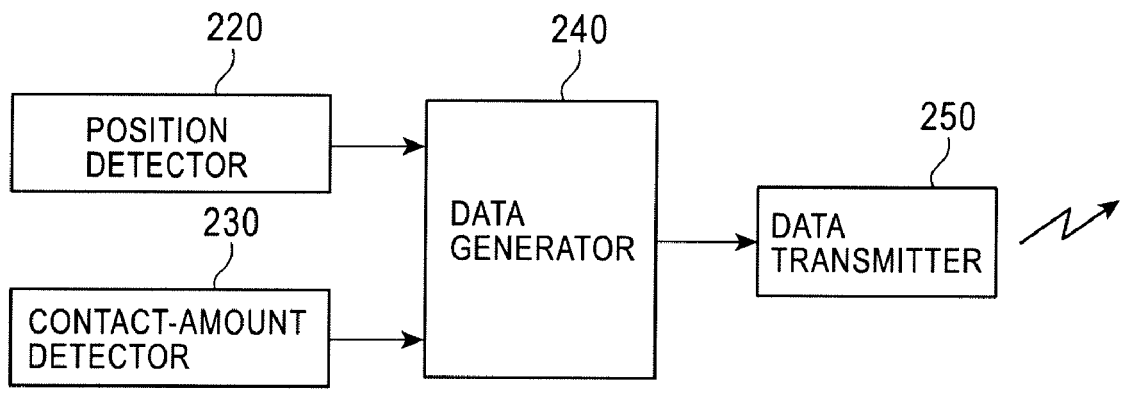
FIG. 3 is a block diagram showing the electrical configuration of the remote input device of the embodiment.

FIG. 3 is a block diagram showing the electrical configuration of the remote input device 100. The remote input device 100 includes a position detector 220, a contact-amount detector 230, a data generator 240, and a data transmitter 250. The position detector 220 detects, of the 5-column×5-row input-operation areas, an input-operation area on which an input operation is performed, and transfers the position information of the detected input-operation area 210 to the data generator 240. The contact-amount detector 230 detects an amount of contact made at the input-operation area 210 on which the input operation was performed, that is, detects whether the contact is a first-stage input or a second-stage input, and transfers the detection result to the data generator 240. The first-stage input means, for example, finger touching or finger sliding (dragging), and the second-stage input means depressing or pressing with a predetermined force or greater. The data generator 240 generates input data based on the detected position information and the amount of contact, and sends the generated input data to the data transmitter 250. The data transmitter 250 transmits the input data wirelessly or via a cable.

Figure 4:
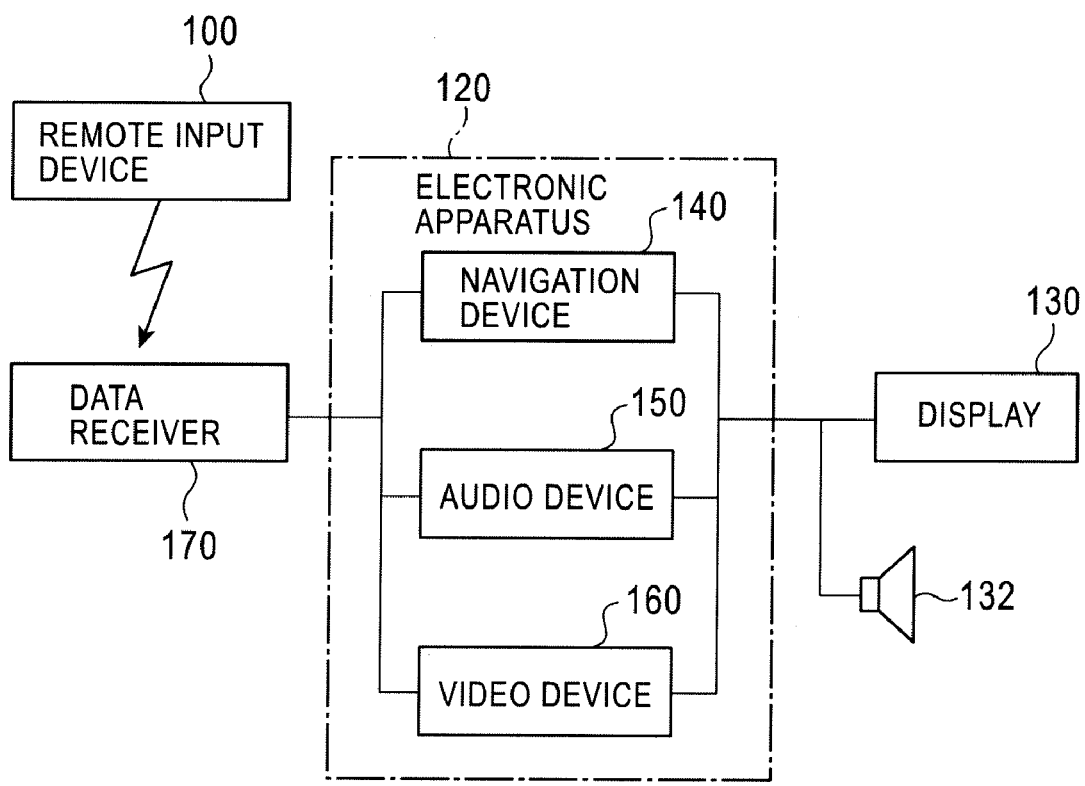
FIG. 4 is a diagram showing one example of an electronic apparatus to which the remote input device is connected.

FIG. 4 is a block diagram showing the configuration of the electronic apparatus 120. In the present embodiment, the electronic apparatus 120 includes, but is not limited to, a navigation device 140, an audio device 150, and a video device 160. These devices share the remote input device 100, the display 130, and a speaker 132. A data receiver 170 receives the input data transmitted from the remote input device 100 and sends the received input data to one of the devices 140, 150, and 160 which is displaying data on the display 130. For example, with a menu screen of the navigation device 140 being displayed on the display 130, when the user performs an input operation on the remote input device 100 in response to the menu screen, the input data is processed by the navigation device 140.

FIG. 5 is a diagram showing the configuration of the navigation device 140. The navigation device 140 includes a GPS receiver 300 for measuring the current position and current orientation of the vehicle by receiving radio waves from GPS satellites; an autonomous navigation sensor 302 including a vehicle-speed sensor, a gyro-sensor, and so on; a VICS (Vehicle Information and Communication System) receiver 310; a user input interface 320; a storage device 330 including a large-capacity hard disk; a program memory 340 for storing programs; a data memory 350 for temporarily storing data; and a controller 360. The user input interface 320 includes a touch panel 322, an audio input unit 324, the remote input device 100, and so on. The controller 360 controls the above-noted individual elements of the navigation device 140.

The storage device 330 stores databases and programs for executing various functions for navigation. Examples of the programs include a program for searching for a route to a destination, a program for searching for a destination, a program for performing various types of input setting, and a program for decrypting input data received from the remote input device 100. The controller 360 controls a navigation operation in accordance with the programs and also executes an operation in response to an input operation received through the user input interface 320.

Figure 6A:
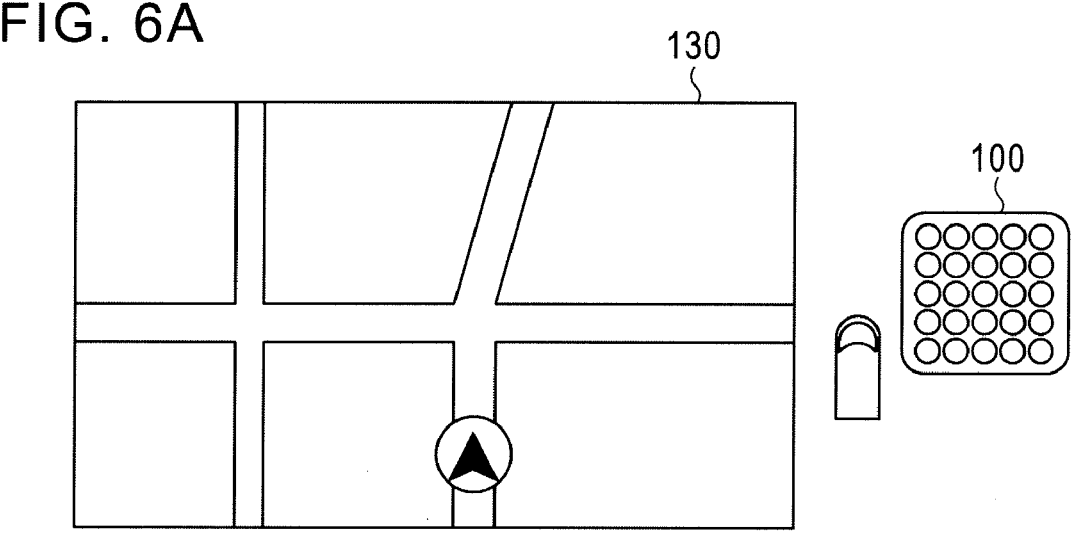
FIGS. 6A to 6C are schematic views showing an example of input operation of the remote input device according to the embodiment.

Next, a description is given of an example in which the remote input device 100 is used to perform an input operation for controlling to the navigation device 140. It is assumed that the input to the remote input device 100 is performed with the user's finger. In this case, it is assumed that the navigation device 140 is launched and a map of the vicinity of the vehicle is displayed on the display 130, as shown in FIG. 6A. When the finger is not in contact with the remote input device 100, the navigation device 140 is in an input-operation waiting mode in which operation buttons for prompting input operations are not displayed on the display 130.

Figure 6B:
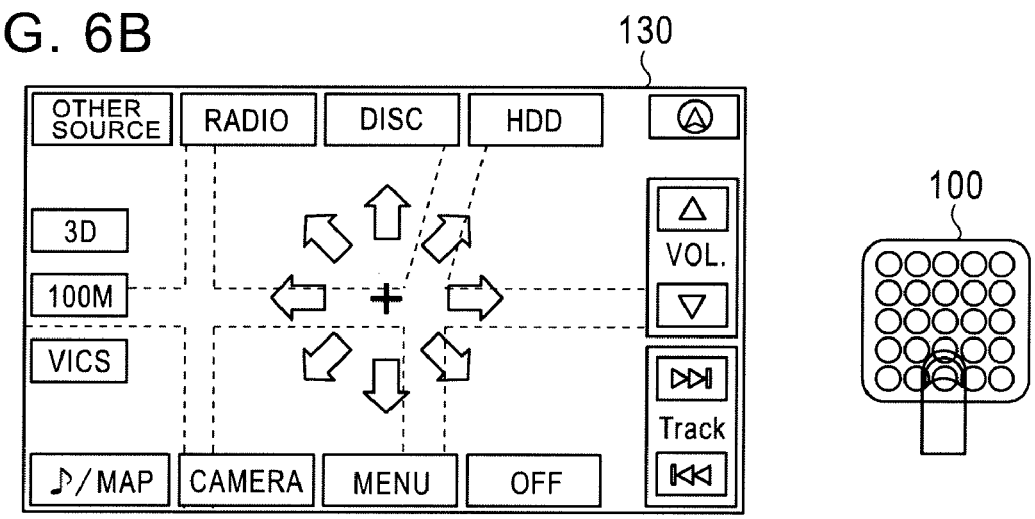

Next, when the finger makes contact with any of the input-operation areas 210 of the remote input device 100, the data generator 240 (see FIG. 3) generates input data corresponding to a first-stage input, based on signals from the position detector 220 and the contact-amount detector 230, and transmits the generated input data via the data transmitter 250. The controller 360 of the navigation device 140 receives the input data via the data receiver 170. In response to the input data, the controller 360 displays multiple selection buttons for prompting input via the display 130, as shown in FIG. 6B.

Figure 6C:
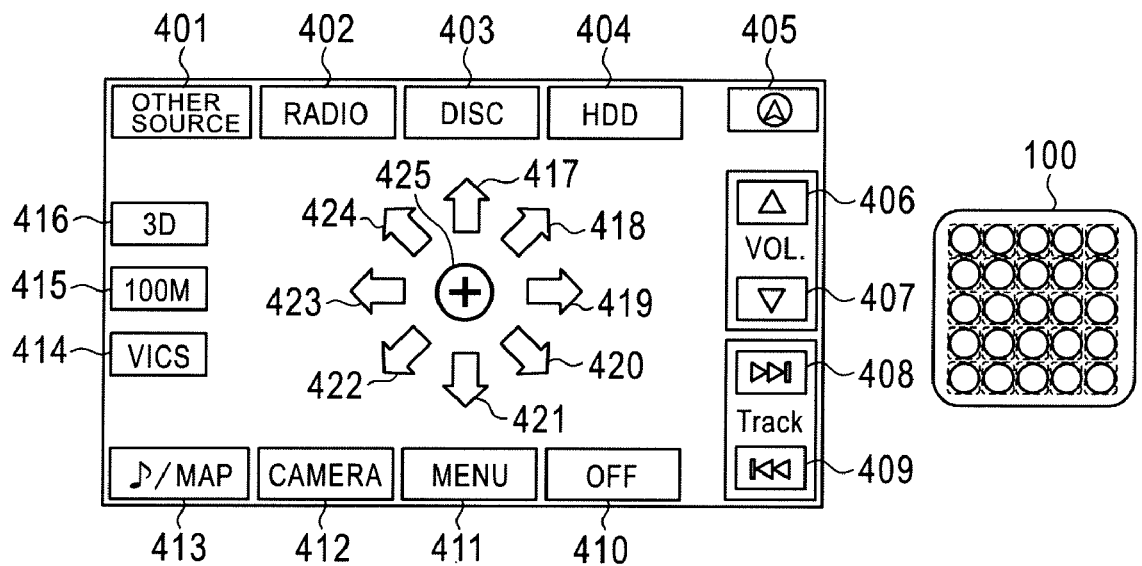

When the number of selection buttons displayed on the display 130 matches the number of input-operation areas 210 of the remote input device 100, the selection buttons are allocated so as to correspond to the input-operation areas 210 on a one-to-one basis. The allocation information is stored in the storage device 330 or the data memory 350. As shown in FIG. 6C, an "OTHER SOURCE" button 401 used for switching to another source, a "RADIO" button 402 used for selecting a radio, a "DISC" button 403 used for selecting a CD or DVD disc, an "HDD" button 404 used for selecting the hard disk 330, and an icon 405 used for returning to a roadmap screen are displayed at the upper edge of the display 130. The five selection buttons 401 to 405 are respectively allocated to the input-operation areas 210 in the first row on the remote input device 100.

Icons 406 and 407 used for turning up and down the volume and icons 408 and 409 used for fast-forwarding and fast-rewinding a track are displayed at the right edge of the display 130. The selection buttons 405 to 409 are respectively allocated to the fifth-column input-operation areas 210 of the remote input device 100.

Further, an "OFF" button 410 used for turning off the selection buttons, a "MENU" button 411 used for displaying a menu screen, a "CAMERA" button 412 used for displaying a video image of the vicinity which is captured by a vehicle-mounted camera, and a button 413 used for switching between the roadmap screen and an audio screen are displayed at the lower edge of the display 130. The selection buttons 409 to 413 are respectively allocated to the fifth-row input-operation areas 210 of the remote input device 100.

A "VICS" button 414 used for displaying road traffic information and so on, a "100 M" button 415 used for setting the display scale of the roadmap to 100 meters, and a "3D" button 416 used for displaying the roadmap in three dimensions are displayed at the left edge of the display 130. The selection buttons 413 to 416 are allocated to the corresponding first-column input-operation areas 210 of the remote input device 100.

At the center portion of the display 130, scroll icons for scrolling the roadmap are drawn. More specifically, eight-direction arrows 417, 418, 419, 420, 421, 422, 423, and 424 for issuing scroll-direction instructions and an icon 425 for setting a point located by scrolling are displayed. These selection buttons 417 to 425 are allocated to the remaining input-operation areas 210, respectively.

When the selection buttons are displayed on the display 100, the user can perform input operations and enter input/commands via the input-operation areas 210. When the user touches any of the input-operation areas 210, the position detector 220 detects the input-operation area touched by the user, and the contact-amount detector 230 detects whether the contact is a first-stage input or a second-stage input. When a first-stage input (e.g., by dragging with the finger) is detected, the controller 360 causes the detected selection button to be highlighted in response to the drag operation so as to allow it to be distinguished from the other selection buttons. On the other hand, when a second-stage input is detected by the contact-amount detector 230, the controller 360 determines that an input operation is performed on the corresponding selection button allocated to the depressed input-operation area 210. The selection buttons 401 to 425 displayed on the display 130 can be used not only for accepting input operations using the remote input device 100, but also for accepting input operations via the touch panel that is directly touched by the user.

Next, a description will be given of an operation example of a case in which the number of selection buttons displayed on the display 130 is smaller than the number of input-operation areas 210 of the remote input device 100. One preferable scheme is to allocate one selection button to multiple input-operation areas 210. In this case, the positions and the number of input-operation areas 210 to be allocated are selected according to the positions and the sizes of the selection buttons displayed on the display 130.

FIG. 7 shows an example of a display screen of the navigation device 140 when performing hierarchical search refinement for a destination. More specifically, FIG. 7 shows a case in which searching is performed in the order of "facility", "hobby", and "campground" categories and a "Northeast" region is further selected in the campground category. This display screen shows a total of 14 selection buttons, that is, an icon 430 used for returning to the roadmap screen, arrow keys 431 and 432 used for scrolling the region, scroll keys 433 and 434 used for scrolling entries ("states" in this example) in a list upward, an "ENTER" button 435 used for making an input definite, scroll keys 436 and 437 used for scrolling the entries in the list downward, an icon 438 used for switching to the roadmap display screen, and five buttons (where "New Hampshire", "New Jersey", "New York", "Pennsylvania", and "Rohde Island" are shown in this example) 439, 440, 441, 442, and 443 used for selecting the entries in the list.

For convenience of description, the input-operation areas 210 are numbered 1 to 25, as shown at the bottom part of FIG. 7. In this case, the selection button (the arrow key) 431 corresponds to the input-operation areas 1 and 2, the selection button 439 (showing "New Hampshire") corresponds to the input-operation area 3, the selection button 432 corresponds to the input-operation area 4, and the selection button 430 corresponds to the input-operation area 5. The selection button 434 corresponds to the area 6, the selection button 433 corresponds to the area 7, and the selection button 440 corresponds to the three areas 8, 9, and 10. The selection button 435 corresponds to the areas 11 and 12 and the selection button 441 corresponds to the three areas 13, 14, and 15. The selection button 437 corresponds to the area 16, the selection button 436 corresponds to the area 17, and the selection button 442 corresponds to the three areas 18, 19, and 20. The selection button 438 corresponds to the two areas 21 and 22 and the selection button 443 corresponds to the three areas 23, 24, and 25.

In this example, each input-operation area 210 is allocated to one or more selection buttons, and thus, there is no input-operation area that is not used for entering input. Thus, in response to contact (drag) and depression by the user's finger, the first-stage input and the second-stage input can be received by the controller 360.

When the search refinement is performed on the search screen or the like, the number of selections decreases further. In this case, when the screen layout does not substantially change relative to the previous screen layout, input to or the acceptance of input operations via the input-operation areas may be disabled without changing the allocation between the selection buttons and the input-operation areas 210. For example, it is assumed that a search screen as shown in FIG. 8 is displayed after the search refinement up to New York and Queens is performed on the screen shown in FIG. 7. The layout of the selection buttons 430 to 442 shown in FIG. 8 does not substantially change relative to that shown in FIG. 7; therefore, the input-operation areas 210 allocated to the selection buttons 430 to 442 are the same as those shown in FIG. 7. In the case shown in FIG. 8, the selection button 443 is allocated to the area 23, the selection button 444 is allocated to the area 24, and the selection button 445 is allocated to the area 25.

When a first-stage input operation (i.e., contact or drag with the user's finger) is performed, the controller 360 enables the input or the acceptance of input information, but when a second-stage input operation is performed on the selection buttons 441, 442, and 443, the controller 360 disables the input or the acceptance of input information.

Figure 9:
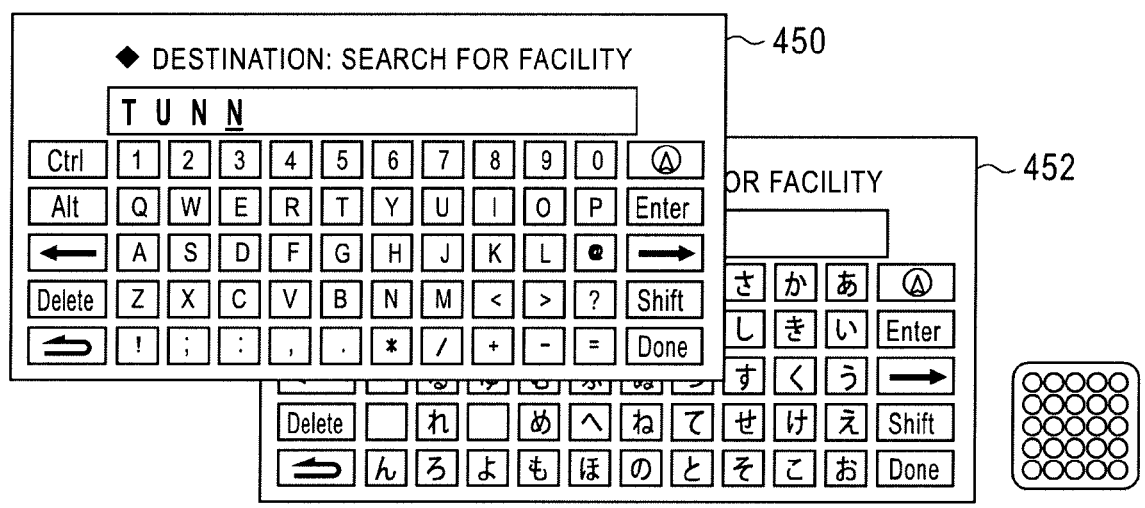
FIG. 9 is a schematic view showing a virtual keyboard displayed as an example in which the number of selection buttons is larger than the number of input-operation areas.

Next, a description will be given of an operation example of a case in which the number of selection buttons displayed on the display 130 is larger than the number of input-operation areas 210 of the remote input device 100. For example, as shown in FIG. 9, when a virtual keyboard 450 with English letters or a virtual keyboard 452 with 50 Japanese hiragana characters is displayed on the display 130, the number of selection buttons (selection keys) on the virtual keyboard exceeds the number of input-operation areas 210, which is 25 in this example.

Figure 10:
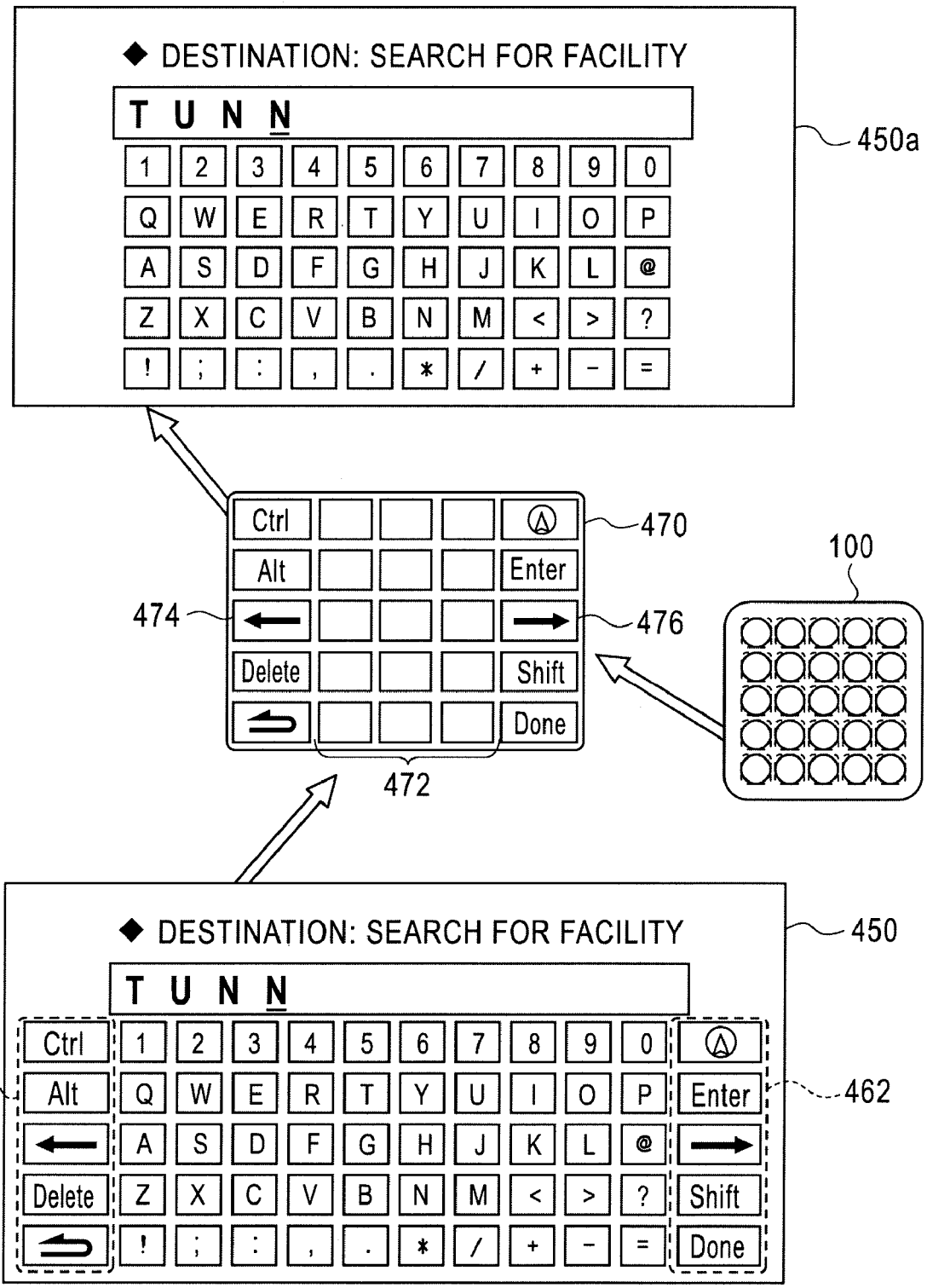
FIG. 10 is a schematic view illustrating the allocation of the input-operation areas on the virtual keyboard shown in FIG. 9.

In this case, as shown in FIG. 10, function keys 460 (for "Control", "Alter", "Scroll Left", "Delete", and "Return") and functions keys 462 (for "Return to Road Map Screen", "Enter", "Scroll Right", "Shift", and "Done"), which are provided at two opposite sides of the virtual keyboard, are respectively allocated to the first column and the fifth column of the input-operation areas 210 of the remote input device 100 to thereby virtually set a character input finder 470. The character input finder 470 can be scrolled on the keyboard to perform an input operation.

As described above, the function keys 460 and 462 are allocated to the first column and the fifth column of the character input finder 470, and include scroll keys 474 and 476 for scrolling the character input finder 470 to the left side and the right side. The three columns consisting of the second, third, and fourth columns of the character input finder 470 serve as character input areas 472 via which corresponding characters can be directly input. The selection buttons allocated to the character input areas 472 are changed every time the character input finder 470 is scrolled. That is, with the character input finder 470 being drawn on the keyboard, when an input operation performed on the input-operation area corresponding to the scroll key 474 or 476 is detected, the controller 360 scrolls the character input finder 470 to either the left side or the right side and changes the allocation of the selection buttons relative to the character input areas 472, in accordance with the scrolled position.

Figure 11A:
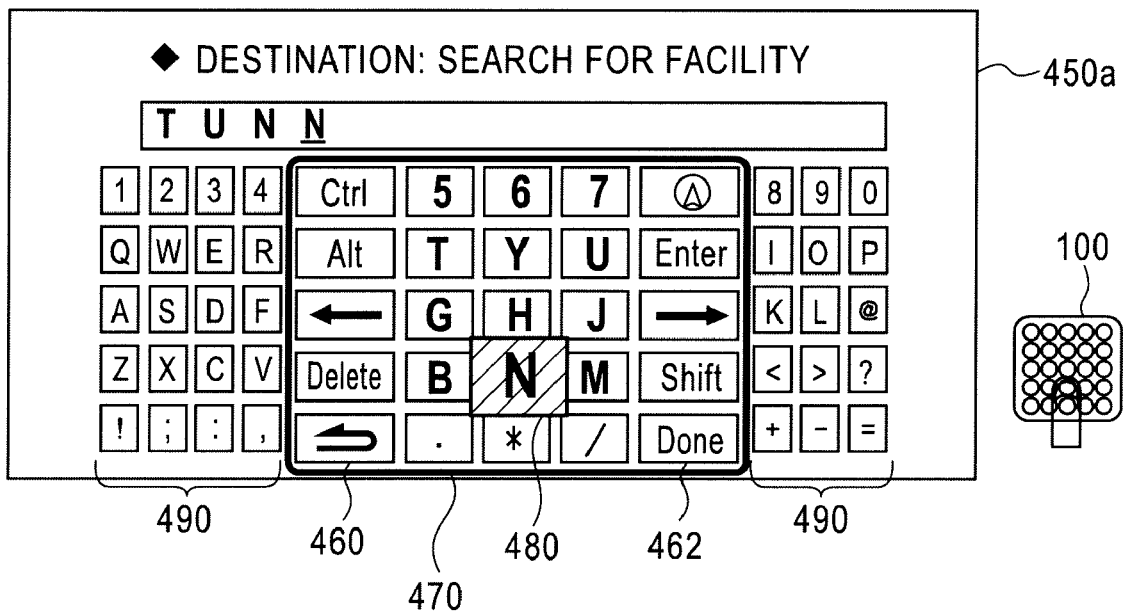
FIGS. 11A to 11D are schematic views illustrating an example of performing input operations using an input character finder.

An example of a specific input operation will now be described with reference to FIGS. 11A to 11D. FIG. 11A shows an example of a screen on which the character input finder 470 is drawn on a keyboard 450a when a destination is input using English letters. In this case, the function keys 460 and 462 displayed at the two opposite sides of the keyboard 450 shown in FIG. 10 are deleted and are, instead, displayed on the keyboard 450a in an interposed manner as selection buttons allocated to the first and fifth columns of the character input finder 470. More specifically, the function keys 460 corresponding to the first column are displayed in an interposed manner between the column containing '4', 'R', 'F', 'V', and ',' and the column containing '5', 'T', 'G', 'B', and '.', and the function keys 462 corresponding to the fifth column are displayed in an interposed manner between the column containing '7', 'U', 'J', 'M', and '/' and the column containing '8', 'I', 'K', '<', and '+'.

Preferably, the function keys 460 and 462 corresponding to the first and fifth columns are displayed in larger sizes than the other selection buttons, or selection buttons 490 outside the first and fifth columns of the character input finder 470 are displayed in smaller sizes. Additionally, the function keys 460 and 462 corresponding to the first and fifth columns may be displayed in a different color from the color of the other selection buttons 490. This arrangement allows the user to easily recognize the range of the character input areas 472 located between the first column and the fifth column. In this example, the column containing '5', 'T', 'G', 'B', and '.', the column containing '6', 'Y', 'H', 'N', and '*', and the column containing '7', 'U', 'J', 'M', and '/' are allocated to the character input areas 472, and the corresponding selection buttons are displayed with a greater magnification than the other selection buttons. FIG. 11A shows a state in which an input operation is performed on the input-operation area corresponding to the "N" selection button 480 in the character input areas 472 and the selection button 480 is highlighted.

Figure 11B:
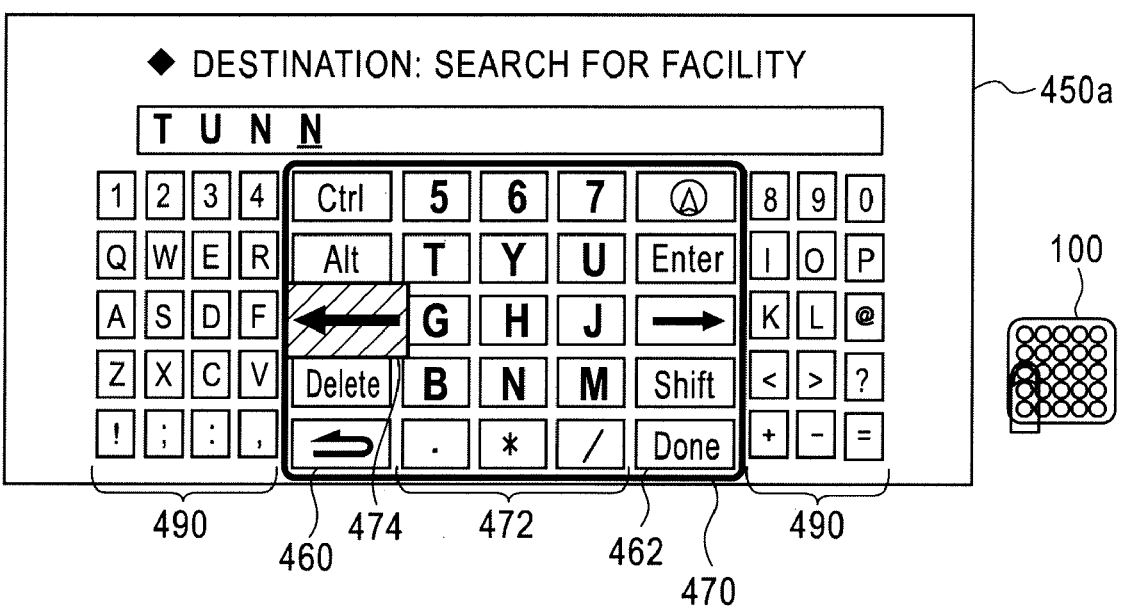

FIG. 11B shows a state in which an input operation is performed on the input-operation area corresponding to the scroll key 474 in the character input finder 470 and the scroll key 474 is highlighted to indicate that it is selected. This input operation is a first-stage input operation.

Figure 11C:
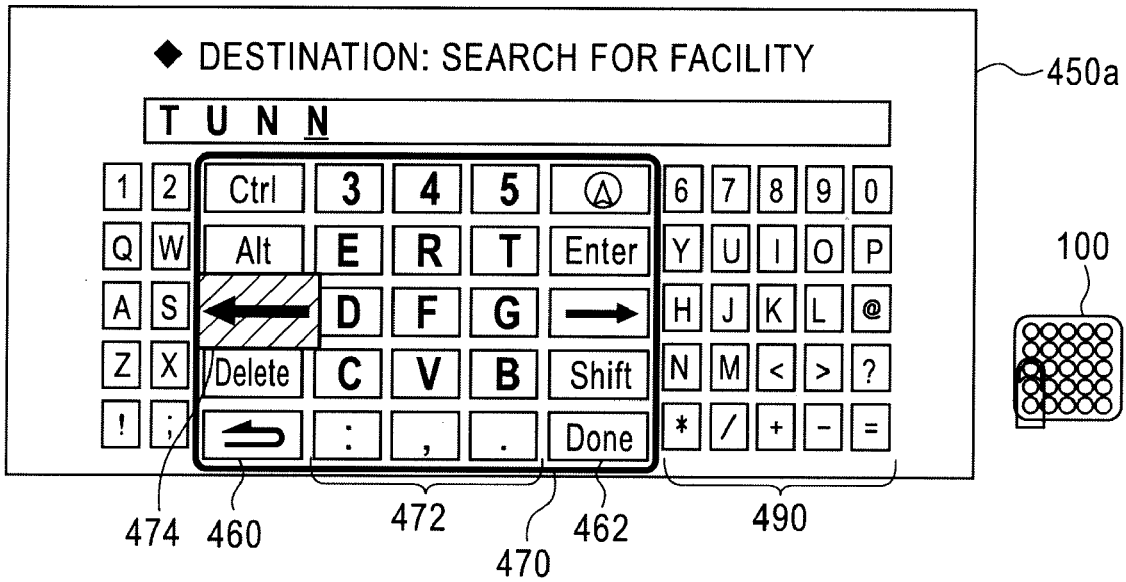

Next, as shown in FIG. 11C, when a second-stage input to the scroll key 474 is detected, the controller 360 determines that an input operation has been performed on the scroll key 474 and scrolls the character input finder 470 in accordance with the number of second-stage inputs or the duration of the second-stage input (depression). As a result, for example, the function keys 460 in the first column of the character input finder 470 are displayed in an interposed manner between the column containing '2', 'W', 'S', 'X', and ';' and the column containing '3', 'E', 'D', 'C', and ':'; the function keys 462 in the fifth column of the character input finder 470 are displayed in an interposed manner between the column containing '5', 'T', 'G', 'B', and '.' and the column containing '6', 'Y', 'H', 'N', and '*'; and the column containing '3', 'E', 'D', 'C', and ':', the column containing '4', 'R', 'F', 'V', and ',', and the column containing '5', 'T', 'G', 'B', and '.' are allocated to the character input areas 472.

Figure 11D:
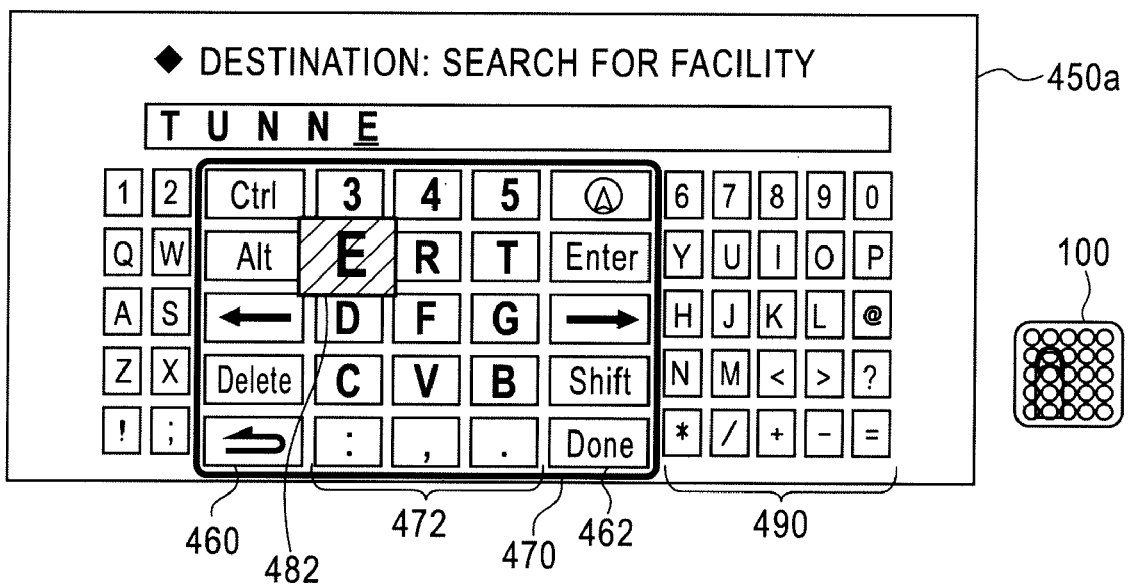
Figure 12:
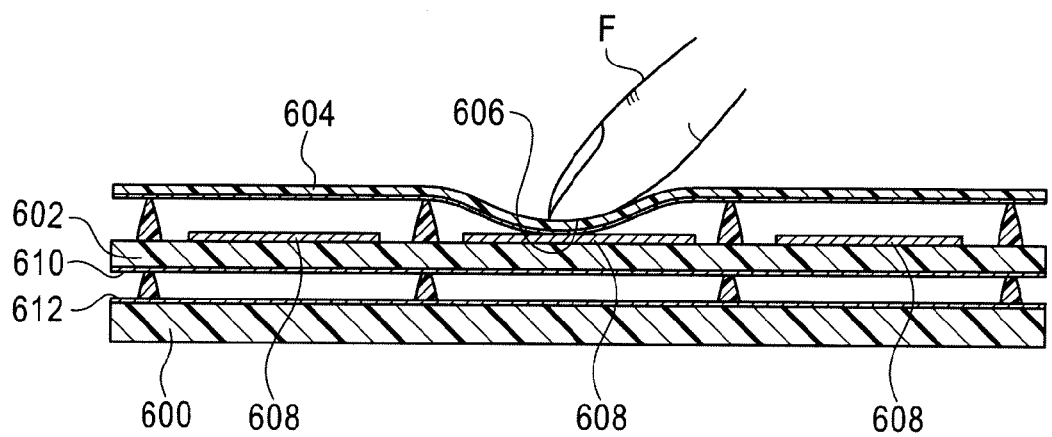
FIG. 12 is a cross-sectional view showing the structure of a known remote input device.

Next, as shown in FIG. 11D, a first-stage input operation is performed on the input-operation area corresponding to the "E" selection button 482 in the character input areas 472, and the selection button 482 is highlighted. Thereafter, a second-stage input operation is performed to make the "E" input definite.

As described above, the character input finder 470 is used, and the function keys 460 and 462 in the first and fifth columns of the character input finder 470 are displayed on the keyboard 450a in a scrollable manner. This arrangement allows the user to easily recognize the range in which characters can be selected. In addition, since the input-operation areas in three columns are allocated to the character input areas 472, the user can easily adjust a scroll-stop position so that a desired selection button is included in the character input areas 472 even when the scroll-stop position is displaced to some extent.

In the embodiment described above, since the horizontal dimension of the virtual keyboard is greater than the vertical dimension, the function keys 460 and 462 are allocated to the corresponding first and fifth columns of the character input finder 470. However, for an arrangement in which the selection buttons are displayed in a vertically oblong array, the function keys 460 and 462 may be allocated to the first and fifth rows of the character input finder 470 so that the character input finder 470 can be vertically scrolled. Although the scroll keys are allocated to the first and fifth columns of the character input finder 470, keys other than the scroll keys may be allocated so as to move or change the position of the character input finder 470. Moreover, in the embodiment described above, although the function keys 460 in the first column of the character input finder 470 and the function keys 462 in the fifth column are displayed in an interposed manner between corresponding columns on the keyboard, the function keys 460 and 462 may be displayed superimposed on corresponding columns.

In the embodiment described above, although the input-operation areas of the remote input device are arranged in 5 columns×5 rows, naturally, they may be arranged in a horizontally oblong array having, for example, 3 rows×5 columns or in a vertically oblong array having, for example, 5 rows×3 columns. In addition, although a double-action switch that allows first-stage and second-stage input operations to be performed was used for the remote input device, a switch using only a first-stage input operation may be used.

While the preferred embodiment of the present invention has been described above in detail, the present invention is not limited to the specific embodiment, and various modifications and changes can be made thereto without departing from the spirit and scope of the present invention, which is construed in the appended claims.

The present invention is applicable to personal computers, navigation devices, and other electronic apparatuses which use remote input devices, such as remote controllers.

What is claimed is:

1. An electronic system, comprising:
    a remote input device including:
        input-operation areas associated with the acceptance of input operations, and
        detecting means for detecting an input operation performed on individual input-operation areas;
    a display that is separate from the remote input device;
    displaying means for displaying selection buttons for prompting input operations on the display;
    allocating means for allocating the selection buttons displayed on the display among the input-operation areas, wherein when the number of selection buttons displayed on the display is larger than the number of input-operation areas, the allocating means allocates at least one change selection button to at least one of the input-operation areas instead of at least one selection button, the at least one change selection button associated with an allocation change; and
    input determining means for determining, when the detecting means detects the input operation, if the input operation is performed on a selection button allocated to an individual input-operation area associated with the input operation,
    wherein the allocating means comprises allocation changing means for changing the allocation of the selection buttons relative to selected input-operation areas when the input determining means determines that the input operation is performed on the change selection button.

2. The electronic system according to claim 1, wherein the input-operation areas are arranged in a two-dimensional array having multiple columns and multiple rows, and the allocating means allocates change selection buttons to at least one input-operation area corresponding to a first column and at least one input-operation area corresponding to a last column or at least one input-operation area corresponding to a first row and at least one input-operation area corresponding to a last row of the two-dimensional array.

3. The electronic system according to claim 2, wherein the selected input-operation areas comprise input-operation areas between the first column and the last column or between the first row and the last row.

4. The electronic system according to claim 1, wherein the displaying means displays the selection buttons corresponding to the selected input-operation areas with a greater magnification.

5. The electronic system according to claim 1, wherein the displaying means displays the change selection button so as to be distinguished from other selection buttons.

6. The electronic system according to claim 1, wherein the change selection button comprises a scroll key or a move key.

7. The electronic system according to claim 6, wherein the input-operation areas are arranged in a two-dimensional array having multiple rows and multiple columns, and the allocating means allocates the scroll key or move key to at least one input-operation area corresponding to a first column and at least one input-operation area corresponding to a last column or at least one input-operation area corresponding to a first row and at least one input-operation area corresponding to a last row of the two-dimensional array and allocates other function keys to other input-operation areas in the first column and the last column or the first row and the last row.

8. The electronic system according to claim 1, wherein the detecting means detects a first input operation from a first pressure sensed on any of the input-operation areas and a second input operation from a second pressure sensed greater than the first pressure, and the displaying means displays the selection buttons on the display when the detecting means detects the first input operation.

9. The electronic system according to claim 8, wherein the displaying means displays the selection buttons on the display for a predetermined period of time after the detecting means detects the first or the second input operation.

10. The electronic system according to claim 1, wherein the detecting means detects a first input operation from a first pressure exerted on any of the input-operation areas and a second input operation from a second pressure exerted greater than the first pressure, and when the detecting means detects the first input operation, the displaying means displays the selection button corresponding to the input-operation area associated with the input operation detected so as to be distinguished from other selection buttons.

11. The electronic system according to claim 2, wherein when displaying a virtual keyboard comprising selection buttons, the displaying means displays the change selection buttons, which are allocated in the first column and the last column or the first row and the last row of the two-dimensional array, between selected columns or selected rows of the virtual keyboard in an interposed manner.

12. The electronic system according to claim 1, wherein when a virtual keyboard comprising selection buttons is displayed on the display, the displaying means displays the change selection buttons superimposed on selected columns or selected rows of the virtual keyboard.

13. The electronic system according to claim 11 or 12, wherein when the input operation is performed on one of the change selection buttons, the displaying means scrolls or moves the change selection buttons on the virtual keyboard.

14. A method of controlling operation of an electronic apparatus by using a remote input device having input-operations areas and detecting means for detecting an input-operation area associated with an input operation, the input method comprising:
    displaying selection buttons for prompting input operations on a display that is separate from the remote input device;
    allocating the displayed selection buttons among input-operation areas of a remote input device, and allocating, when the number of displayed selection buttons is larger than the number of input-operation areas, at least one change selection button to at least one of the input-operation areas instead of at least one selection buttons, the change selection button associated with an allocation change;

determining, when a detecting means detects an input operation performed on any of the input-operation areas, if the input operation is performed on the selection button allocated to the input-operation area associated with the change selection button; and changing the allocation of the displayed selection buttons relative to selected input-operation areas, when it is determined that the input operation is performed on the change selection button.

15. The method according to claim 14, further comprising displaying the selection buttons corresponding to the selected input-operation areas with a greater magnification.

16. The method according to claim 14, further comprising displaying the change selection button so as to be distinguished from other selection buttons.

17. The method according to claim 14, wherein the input-operation areas are arranged in a two-dimensional array having multiple columns and multiple rows, and wherein change selection buttons are allocated to at least one input-operation area corresponding to a first column and at least one input operation area corresponding to a last column or at least one input operation area corresponding to a first row and a at least one input operation area corresponding to a last row of the two-dimensional array.

* * * * *